United States Patent [19]

Mackereth

[11] Patent Number: 4,668,989

[45] Date of Patent: May 26, 1987

[54] FADING CIRCUIT FOR VIDEO SIGNALS

[75] Inventor: Thomas C. Mackereth, Cambridge, England

[73] Assignee: U.S. Philips Corporation, New York, N.Y.

[21] Appl. No.: 721,119

[22] Filed: Apr. 8, 1985

[30] Foreign Application Priority Data

Apr. 26, 1984 [GB] United Kingdom ................. 8410704

[51] Int. Cl.$^4$ ........................................... H04N 5/265
[52] U.S. Cl. .................................................... 358/182
[58] Field of Search ................. 358/182, 22, 160, 166, 358/183

[56] References Cited

U.S. PATENT DOCUMENTS

| | | | |
|---|---|---|---|
| 2,233,317 | 2/1941 | Konkle | 358/182 |
| 2,412,279 | 12/1946 | Miller, Jr. | 358/182 |
| 2,964,589 | 12/1960 | Walker | 358/182 |
| 4,223,351 | 9/1980 | Tsujimura et al. | 358/182 |

Primary Examiner—Tommy P. Chin

Attorney, Agent, or Firm—Thomas A. Briody; Jack Oisher; William J. Streeter

[57] ABSTRACT

The fading circuit comprises first and second video signal inputs (1,12) for receiving 8 bit parallel digitally encoded video signals and first and second fading control signal inputs (5,16) for receiving 8 bit parallel fading control signals. First and second multipliers (4,15) multiply the video signals by the fading control signals. The outputs of the multipliers (4,15) are truncated to 9 bits and fed to first and second inputs of an adding arrangement (11). A dither signal is fed from a dither signal generator (22) to the carry input (24) of the adding arrangement (11). The output of the adding arrangement (11) is fed to a ROM (28) which is programmed to add 1/256th of the output of the adding arrangement (11) to the output of the adding arrangement (11) and produce an 8 bit output which is applied to the output (31) of the fading circuit. By adding the dither signal amplitude transitions in the output signal at particular settings of the fading control signals are blurred and do not produce such a disturbing effect on the display screen.

10 Claims, 4 Drawing Figures

FADING CIRCUIT FOR VIDEO SIGNALS

BACKGROUND OF THE INVENTION

The invention relates to a fading circuit for video signals comprising samples encoded as a k bit binary code, where k is an integer greater than 1. The fading circuit comprises n video signal inputs, where n is an integer, each video signal input being connected to a first set of inputs of a respective digital multiplier, n fading control signal inputs for fading control signals in the form of m bit binary signals, where m is an integer greater than 1, each fading control signal input being connected to a second set of inputs of the respective digital multipliers, each digital multiplier having an (k+m) bit output, at least the (k+1) most significant bits of which outputs are connected to respective inputs of an adding arrangement, and means for connecting the k most significant bits of the adding arrangement output to the output of the fading circuit as the output video signal.

Video signal manipulation in television studio equipment is increasingly being carried out on video signals which have been converted into digital form. The video signal is generally converted into an eight bit PCM encoded signal at a sampling rate of 13.5 Mhz. A fading circuit for a digitally encoded video signal normally comprises a digital multiplier having a first set of inputs to which the digital video signal is applied and a second set of inputs to which a fading control signal is applied. The fading control signal will also normally be an eight bit binary signal. As a result the multiplier will produce a sixteen bit output. This sixteen bit output has to be truncated to eight bits in order that the video signal can be transmitted to the rest of the system. It has been discovered however that a simple truncation of the sixteen bit output of the multiplier to eight bits gives disturbing results on display at certain settings of the fader control signal. Thus although the truncation gives mathematically correct results the eventual picture displayed contains disturbing amplitude variations.

SUMMARY OF THE INVENTION

It is an object of the invention to enable the provision of a fading circuit for digitally encoded video signals in which the truncation of the output of the multiplier is achieved in a manner which reduces the disturbing effects on television display.

The invention provides a fading circuit as set forth in the opening paragraph characterised by means for adding a dither signal to the (k+1)th most significant bit in or after the final adding stage of the adding arrangement, the dither signal randomly or pseudo randomly taking the binary values '1' and '0', and subsequently truncating the output video signal to k bits.

By adding the dither signal amplitude transitions in the output signal at particular settings of the fading control signals are blurred and do not produce such a disturbing effect on the display screen.

In a fading circuit according to the invention m may be equal to k. This gives the same resolution in the fading control signal as is available for the video signal.

A fading circuit according to the invention may be characterised in that n is equal to 2. In this case two video signals are applied and the fading control signals may be arranged so that it is possible to cross fade between the two video signals by increasing one fading control signal while the other is reduced.

When n is greater than two the adding arrangement may comprise (n−1) binary full adders arranged in cascade, the dither signal being applied to the final full adder circuit. In this arrangement it is important that the dither signal is applied at or subsequent to the final full adder circuit as the beneficial effect will not otherwise be obtained.

A convenient generator for the dither signal is a pseudo random binary sequence generator.

A fading circuit according to the invention may be further characterised in that means for adding 1/256th of the output of the adding arrangement to the output of the adding arrangement is provided between the output of the adding arrangement and the output the fading circuit.

An embodiment of the invention will now be described, by way of example, with reference to the accompanying drawings.

DESCRIPTION OF THE PREFERRED EMBODIMENTS

Figure 1:
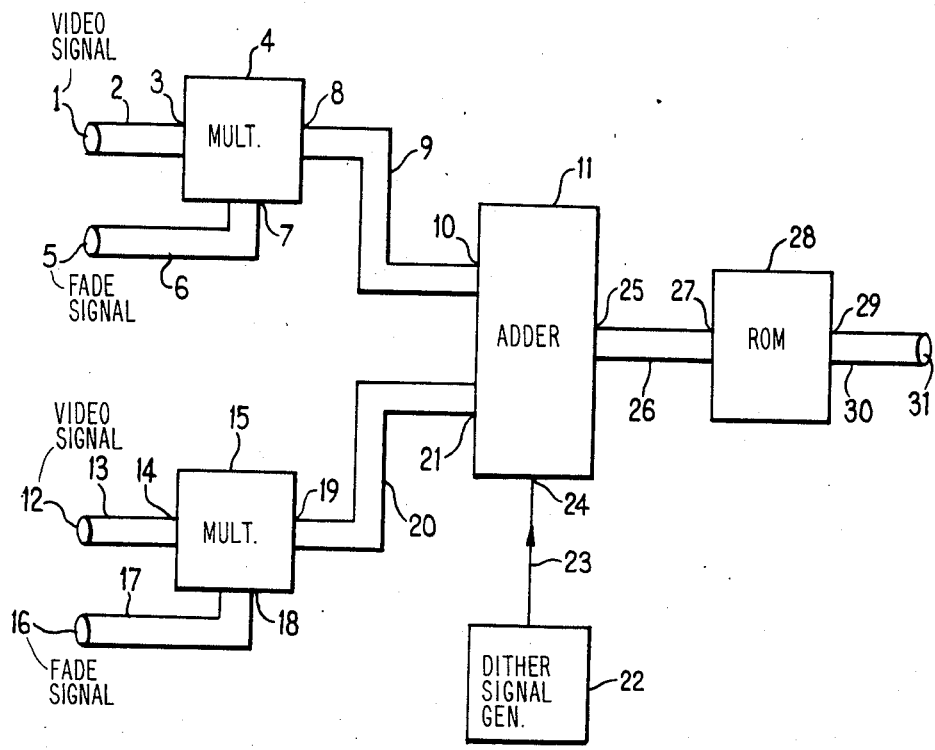
FIG. 1 is a block diagram of a fading circuit according to the invention.

The fading circuit shown in FIG. 1 has an input 1 which is connected via an eight bit bus 2 to a first set of inputs 3 of a multiplier circuit 4. A second input 5 is connected via an eight bit bus 6 to a second set of inputs 7 of the multiplier 4. A set of outputs 8 of the multiplier 4 is connected via a nine bit bus 9 to a first set of inputs 10 of an adding arrangement 11. A third input 12 is connected via an eight bit bus 13 to a first set of inputs 14 of a second multiplier circuit 15, while a fourth input 16 is connected via an eight bit bus 17 to a second set of inputs 18 of the multiplier 15. The output 19 of the multiplier 15 is fed via a nine bit bus 20 to a second set of inputs 21 of the adding arrangement 11. A dither signal generator 22 is connected via a line 23 to a third input 24 of the adder arrangement 11. The output 25 of the adder arrangement 11 is fed via an eight bit bus 26 to the input 27 of a read only memory 28 whose output 29 is fed via an eight bit bus 30 to the output 31 of the fading circuit.

In operation video signals which may be encoded as an eight bit PCM signal at a repetition rate of 13.5 Mhz are applied to inputs 1 and 12. Fading control signals in the form of eight bit binary codes are applied to inputs 5 and 16. In each of the multipliers 4 and 15 the video signal is multiplied by the fading control signal to form a sixteen bit output. The most significant nine bits of the sixteen bit output are fed via the buses 9 and 20 respectively to the adding arrangement 11. In the simple case of two video inputs 1 and 12 as shown in FIG. 1 the adding arrangement 11 may comprise simply a full binary adder. The dither signal generator 22 produces a signal which is randomly a binary '0' or binary '1' the signal varying randomly at the clock rate of 13.5 Mhz so that a digital '1' or '0' is randomly added to the ninth most significant bit of each sample of the video signal in the adder 11. This will cause the eighth most significant bit at the output of the adding arrangement 11 to change randomly.

When two 8 bit binary numbers are multiplied a basic gain error occurs of 1/256th of the answer. To overcome this problem the output from the adding arrangement 11 is fed to a read only memory 28 which is encoded so that the output of the read only memory 28 is equal to the output of the adding arrangement 11 plus 1/256th of the output of the adding arrangement 11. This corrects the basic gain error before the video signal is applied to the output 31 of the fading circuit.

Figure 3:
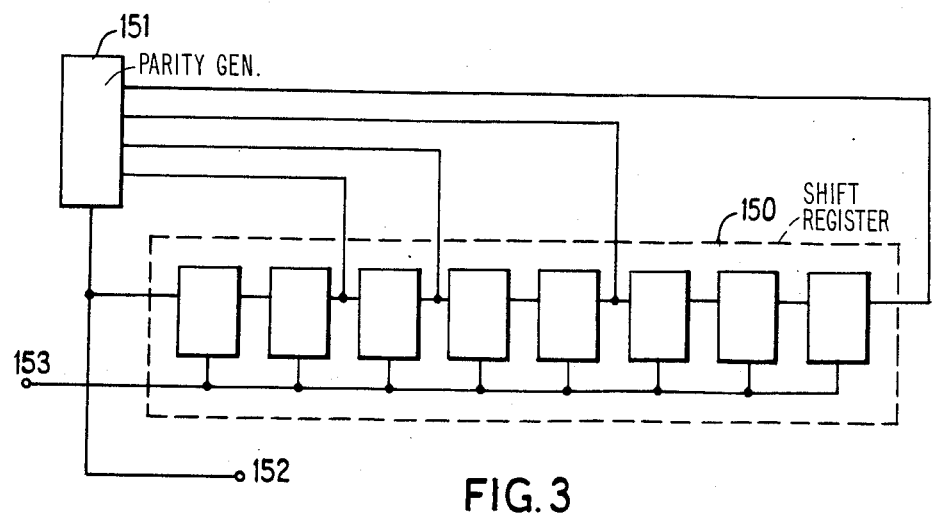
FIG. 3 shows a block diagram of a dither signal generator, in the form of a pseudo random binary sequence generator, for use in the fading circuit of FIG. 1.

The multipliers 4 and 15 may be formed by the integrated circuit sold by TRW Incoroporated under the type No. MPY8HUJ. The adding arrangement 11 may be formed from TTL full binary adders type 74S283. The dither signal generator 22 may be a pseudo random binary sequence generator formed by shift register stages as shown in FIG. 3.

Figure 2:
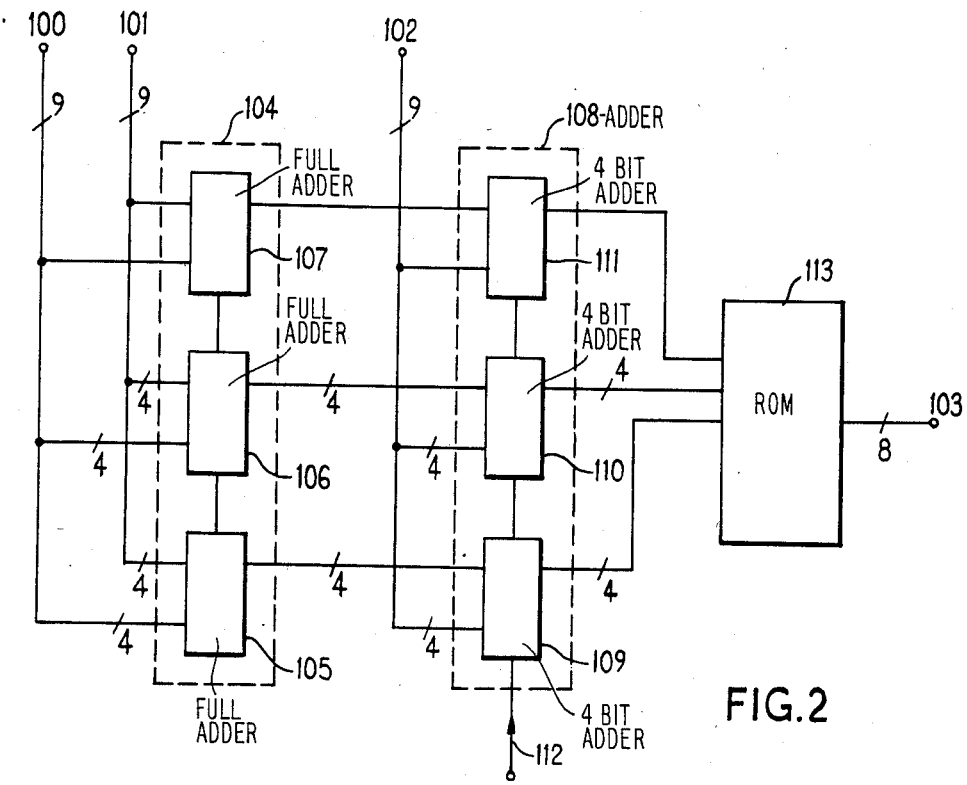
FIG. 2 is a block diagram of an embodiment of an adding arrangement suitable for use in a fading circuit similar to that shown in FIG. 1 but having three video signal inputs.

The number of video input signals is limited only by what is economic and by the number of video signals it is feasible to control and a corresponding number of multipliers and fading control signal inputs would be provided. The adding arrangement 11 would then need to be designed to cater for adding more than two signals together. This can be achieved by cascading adder stages as is shown in FIG. 2. The fading control signals will normally be produced by a microprocessor and this can be programmed to ensure that the fading control signals are such that the adder does not overflow.

FIG. 2 shows in greater detail one embodiment of an adding arrangement 11 for a fading circuit similar to that shown in FIG. 1 but having three video signal inputs, three multipliers, and three fading control signal inputs. FIG. 2 has three inputs 100, 101 and 102 for multiplied video signals A, B and C (not shown). The multiplied video signals A and B are added in a first adder 104 which comprises three type 74S283 full adders 105, 106 and 107. Each of the full adders is capable of adding two four bit numbers. The four least significant bits of the input signals A and B are added in the adder 105 and the carry output of adder 105 is connected to the carry input of adder 106. The next four more significant bits are added in the adder 106 and the carry output of the adder 106 is connected to the carry input of the adder 107. The most significant bit of the signals A and B are added in the adder 107 together with the carry input from the adder 106. In order to add the multiplied third signal C applied to terminal 102 a second adding arrangement 108 is provided. The adding arrangement 108 comprises three four bit adders 109, 110 and 111. The carry output of adder 109 is connected to the carry input of adder 110 and the carry output of adder 110 is connected to the carry input of adder 111. The dither signal is applied via a line 112 to the carry input of adder 109. The nine bits of the signal C are divided so that the most significant bit is connected to the input of the adder 111, the next four bits are connected to the input of adder 110 and the last four bits are connected to the input of adder 109. Similarly the four bits from the output of adder 105 are connected to inputs of adder 109. The four bits from the output of the adder 106 are connected to the input of adder 110 and the one or two bit output of the adder 107 is connected to the input of adder 111.

The maximum result of this addition is an eleven bit number. However, if the fading control signal inputs are chosen so that :

$$Va \times Fa + Vb \times Fb + Vc \times Fc \leq 1$$

where
Va, Vb, Vc are the video signals applied to multipliers a,b, and c (not shown), and
Fa, Fb, Vc are the fading control signals applied to multipliers a,b, and c.
then the maximum result of the addition is a nine bit number.

Figure 4:
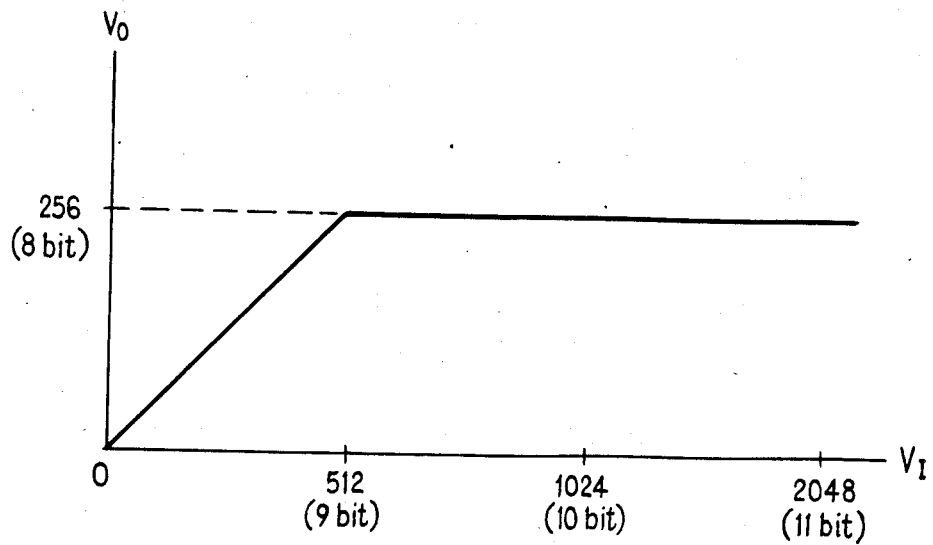
FIG. 4 shows the transfer characteristic of a read only memory suitable for use in the fading circuit shown in FIG. 1.

A nine or eleven bit output from the adder 108 is connected to a read only memory 113 (ROM). The eleven bits are selected such that the three least significant bits of the output of the adder 111 form the three most significant bits, the four bit output from the adder 110 form the next four most significant bits and the four bit of the output of adder 109 form the four least significant bits of the output of the adder 108. As described with reference to FIG. 1 the ROM 113 takes the output of the adder 108 and adds 1/256th of the output of the adder 108 to the output of the adder 108 to form a video output signal which is connected to output 103. The ROM 113 is programmed to give the transfer function $V_o/V_I$ illustrated in FIG. 4. As can be seen in FIG. 4 the data in the linear region, i.e. an input value up to 512, is divided by two. Any input value $V_I$ above 512 is limited to give an output $V_o$ of 256.

FIG. 3 shows a pseudo random binary sequence generator which is suitable for use as the dither signal generator 22 in FIG. 1. The pseudo random binary sequence generator comprises an eight bit shift register 150 the second, third, fifth and eighth stages of which are fed to first, second, third and fourth inputs of a parity generator 151. The output of the parity generator 151 is fed to the input of the shift register 150 and also forms the output of the dither signal generator and is connected to an output terminal 152. A clock signal is applied to a terminal 153 and from there to the clock input of the shift register 150. The shift register may be formed by a type 74S164 TTL integrated circuit while the parity generator may be a type 74S280 TTL integrated circuit. Either the odd or even parity output may be connected to the input of the shift register 150 and either of these outputs may be connected to the output terminal 152. Alternatively any of the inputs to the parity generator 151 could be connected to the output terminal 152 instead of the even or odd parity output from the parity generator 151.

Alternative forms of dither signal generator could be used, for example a comparator having a first input connected to a constant potential and the second input connected to a reference source which produces a reference signal having a randomly varying amplitude in which all amplitude values are equi-probable the range of amplitudes being substantially equal to twice the reference potential. The reference source may, for example, be constructed as described in a paper entitled "A uniformly distributed analogue random voltage generator" by F. Castanie which was published in Proceedings of the IEEE, Vol. 66, No. 5, May 1978 at pages 605 to 606. The output of the comparator will randomly vary between the binary '1' to '0' states depending on whether the random source generator is producing a voltage which is above or below the reference voltage.

I claim:

1. A fading circuit for video signals which comprise digital samples of k binary digits where k is greater than 1 comprising:

a plurality of n video signal inputs, where n is an integer, each of said inputs receiving one of said video signals;

a plurality of n fading control signal outputs for receiving n fading control binary signals, each fading control signal having m bits, where m is an integer greater than 1;

a multiplicity of digital multipliers, each multiplier connected to receive one of said video signals and a respective one of said fading control signals, each multiplier providing an output signal of (k+m) bits which includes (k+1) most significant bits;

an adding means connected to receive at least the (k+1) most significant bits of each multiplier output signal and, producing a summation signal of k bits;

means for generating a digital dither signal of one bit which varies randomly or pseudo-randomly, and adding said bit to said summation signal as the (k+1) most significant bit; and means for truncating said summation signal to a k bit digital signal which comprises the fading circuit output signal.

2. A fading circuit as claimed in claim 1, wherein n is equal to two.

3. A fading circuit as claimed in claim 1, wherein m is equal to k.

4. A fading circuit as claimed in claim 1, characterised in that k is equal to eight.

5. A fading circuit as claimed in claim 1, wherein said adding means comprises (n−1) binary full adders arranged in cascade, the dither signal being applied to the final full adder circuit.

6. A fading circuit as claimed in claim 1, wherein said dither signal is generated by a pseudo random binary sequence generator.

7. A fading circuit as claimed in claim 1 wherein means are provided for adding 1/256th of the output of said adding means to said truncated summation signal.

8. A fading circuit as claimed in claim 1 further comprising a read-only memory connected to said adding means output for adding 1/256th of said adding means output to said truncated summation signal.

9. A fading circuit as claimed in claim 8, characterised in that the output of the read only memory is equal to its input divided by two.

10. A fading circuit as claimed in claim 8, wherein the read only memory gives an output of 255 for any input greater than or equal to 511.

* * * * *